US008040296B2

(12) United States Patent
Lee

(10) Patent No.: US 8,040,296 B2
(45) Date of Patent: Oct. 18, 2011

(54) PLASMA DISPLAY DEVICE AND DRIVING APPARATUS THEREOF

(75) Inventor: Sang-Gu Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 966 days.

(21) Appl. No.: 11/940,266

(22) Filed: Nov. 14, 2007

(65) Prior Publication Data

US 2008/0158215 A1 Jul. 3, 2008

(30) Foreign Application Priority Data

Jan. 2, 2007 (KR) ........................ 10-2007-0000112

(51) Int. Cl.
*G09G 3/28* (2006.01)
*G06F 3/038* (2006.01)

(52) U.S. Cl. ................ 345/69; 345/60; 345/67; 345/68; 345/204; 345/214

(58) Field of Classification Search .................... 345/55, 345/60, 67, 68, 69, 204, 211, 212, 213, 214, 345/690, 691; 315/167, 169.1, 169.4
See application file for complete search history.

(56) References Cited

U.S. PATENT DOCUMENTS 7,612,741 B2 * 11/2009 Kim ................................ 345/67
7,642,993 B2 * 1/2010 Ito .................................. 345/63
2006/0077133 A1 * 4/2006 Yang et al. ...................... 345/68

FOREIGN PATENT DOCUMENTS

JP 2002-32055 1/2002
KR 2003-0033245 5/2003
KR 2003-0040735 5/2003

OTHER PUBLICATIONS

Patent Abstracts of Japan, Publication No. 2002-032055, dated Jan. 31, 2002, in the name of Koji Ito et al.
Korean Patent Abstracts, Publication No. 1020030033245 A, dated May 1, 2003, in the name of Jeong Pil Choi.
Korean Patent Abstracts, Publication No. 1020030040735 A; Date of Publication: May 23, 2003; in the name of Gi Ung Hwang, et al.

* cited by examiner

*Primary Examiner* — My-Chau T Tran
(74) *Attorney, Agent, or Firm* — Christie, Parker & Hale, LLP

(57) ABSTRACT

In one embodiment, a plasma display device includes: a plasma display panel having a plurality of electrodes; a power supply including first and second power sources for respectively supplying first and second voltages, the second voltage being higher than the first voltage; a driving circuit for driving the electrodes; and a controller for generating a first signal to control the driving circuit. The driving circuit includes: a first switch for supplying a third voltage to the electrodes, the third voltage decreasing over a period of time; a switching controller for controlling the first switch in accordance with the first signal and a second signal; and a feedback signal generator for comparing fourth and fifth voltages respectively proportional to the third and second voltages, adjusting a level of the second signal according to a result of comparing the fourth and fifth voltages, and supplying the second signal to the switching controller.

22 Claims, 9 Drawing Sheets

| Yfr1 | Yfr2 | Q1 | Q2 | Q3 |
|---|---|---|---|---|
| 0 | 0 | OFF | OFF | ON |
| 0 | 1 | OFF | ON | OFF |
| 1 | 0 | ON | OFF | OFF |
| 1 | 1 | ON | ON | OFF |

FIG.5

FIG.8

| Yfr1 | Yfr2 | Q1' | Q2' | Q3 | Q5 | Q6 |
|---|---|---|---|---|---|---|
| 0 | 0 | OFF | OFF | OFF | OFF | ON |
| 0 | 1 | OFF | ON | OFF | OFF | ON |
| 1 | 0 | ON | OFF | OFF | OFF | ON |
| 1 | 1 | ON | ON | ON | ON | OFF |

PLASMA DISPLAY DEVICE AND DRIVING APPARATUS THEREOF

CROSS-REFERENCE TO RELATED APPLICATION

This application claims priority to and the benefit of Korean Patent Application No. 10-2007-0000112 filed in the Korean Intellectual Property Office on Jan. 2, 2007, the entire content of which is incorporated herein by reference.

BACKGROUND OF THE INVENTION

1. Field of the Invention

The present invention relates to a plasma display device and a driving apparatus thereof.

2. Description of the Related Art

A plasma display device is a flat panel display device that uses plasma generated by a gas discharge to display characters or images. It includes a plasma display panel (PDP) having hundreds of thousands to millions of discharge cells (hereinafter referred to as cells) arranged in a matrix format, depending on its size.

According to a conventional driving method of a plasma display device, each frame is divided into a plurality of subfields having respective weights (or brightness weights), and gray levels are expressed by a combination of weights from among the subfields, which are used to perform a display operation. Each subfield is divided into a reset period, an address period, and a sustain period and is driven in the periods. Wall charge states of discharge cells are initialized in the reset period, turn-on cells are selected in the address period, and a sustain discharge operation is performed in the turn-on cells for displaying an image (e.g., a substantial image) in the sustain period.

A conventional plasma display device applies a voltage that is higher than a scan voltage to a scan electrode at the end of a reset period by using the scan voltage applied to the scan electrode for selecting turn-on cells during an address period. A driving circuit used for this process will be described with reference to FIG. 1.

FIG. 1 shows a part of a conventional driving apparatus of a plasma display device that drives a scan electrode.

As shown in FIG. 1, the driving apparatus 10 includes a transistor YscL, a Zener diode ZD1, and a transistor Yfr. A drain of the transistor YscL is coupled to a scan electrode Y, a source of the transistor YscL is coupled to a power source VscL, a cathode of the Zener diode ZD1 is coupled to the scan electrode Y, and an anode of the Zener diode ZD1 is coupled to a drain of the transistor Yfr. A drain of the transistor Yfr is coupled to the Zener diode ZD1 and the source of the transistor Yfr is coupled to the power source (e.g., voltage source) VscL.

At the end of the reset period, the transistor Yfr is turned on and the transistor YscL is turned off. Accordingly, a current path is formed from the scan electrode Y through the Zener diode ZD1 and the transistor Yfr to the power source VscL, and a voltage applied to the scan electrode Y is maintained higher than a voltage of VscL at the power source VscL by a constant level ΔV due to the Zener diode ZD1.

In an address period, the transistor Yfr is turned off and the transistor YscL is turned on. Accordingly, a current path is formed from the scan electrode Y through the transistor YscL to the power source VscL, and a voltage applied to the scan electrode corresponds to the VscL voltage.

In general, the VscL voltage is set to about −200 V, and the constant level ΔV is set to about 25 V. Therefore, the Zener diode ZD1 has a high withstand voltage of about 175V. However, the use of the Zener diode having such a high withstand voltage has drawbacks of increased implementation costs as well as power consumption.

In addition, in the conventional driving apparatus 10 of FIG. 1 a size of ΔV cannot be modified. As such, it cannot correspond to design compatibility of a plasma display device and a variation range according to a discharge margin, and a voltage of the scan electrode may be decreased to a voltage level that is lower than a voltage (e.g., a predetermined voltage) due to noise and errors in a control device.

The above information disclosed in this Background section is only for enhancement of understanding of the background of the present invention, and therefore it may contain information that does not form the prior art that is already known in this country to a person of ordinary skill in the art.

SUMMARY OF THE INVENTION

An aspect of the present invention is directed to providing a plasma display device for preventing a voltage of a scan electrode from being decreased to be lower than a voltage (e.g., a predetermined voltage) due to noise and an operation error of a controller, and a driving apparatus thereof.

In an exemplary embodiment of the present invention, a plasma display device includes: a plasma display panel having a plurality of first electrodes, a plurality of second electrodes, and a plurality of third electrodes crossing the first and second electrodes; a power supply including a first power source for supplying a first voltage and a second power source for supplying a second voltage higher than the first voltage; a driving circuit for driving the first electrodes; and a controller for generating a first signal to control a driving operation of the driving circuit. The driving circuit includes: a first switch for supplying a third voltage to the first electrodes, the third voltage decreasing over a period of time; a switching controller for controlling the first switch in accordance with the first signal and a second signal; and a feedback signal generator for comparing a fourth voltage proportional to the third voltage with a fifth voltage corresponding to the second voltage, adjusting a level of the second signal according to a result of comparing the fourth voltage with the fifth voltage, and supplying the second signal to the switching controller.

According to another exemplary embodiment of the present invention, a driving apparatus of a display device having a power supply for generating a first voltage, a controller for generating a first signal, and a plurality of first electrodes, is provided. The driving apparatus includes: a first switch for supplying a second voltage to the first electrodes, the second voltage being configured to decrease over a period of time; a switching controller for controlling the first switch in accordance with the first signal and a second signal; and a feedback signal generator for comparing a third voltage and a fourth voltage proportional to the second voltage, adjusting a level of the second signal, and supplying the second signal to the switching controller.

BRIEF DESCRIPTION OF THE DRAWINGS

FIG. 5 is a truth table showing input signals Yft1 and Yfr2 of a Vnf voltage supplier and driving states of corresponding transistors Q1, Q2, and Q3 according to an exemplary embodiment of the present invention.

FIG. 8 is a truth table showing input signals Yfr1 and Yfr2 of a Vnf voltage supplier and driving states of corresponding transistors Q1, Q2, Q3, and Q4 according to an exemplary embodiment of the present invention.

DETAILED DESCRIPTION

Figure 1:
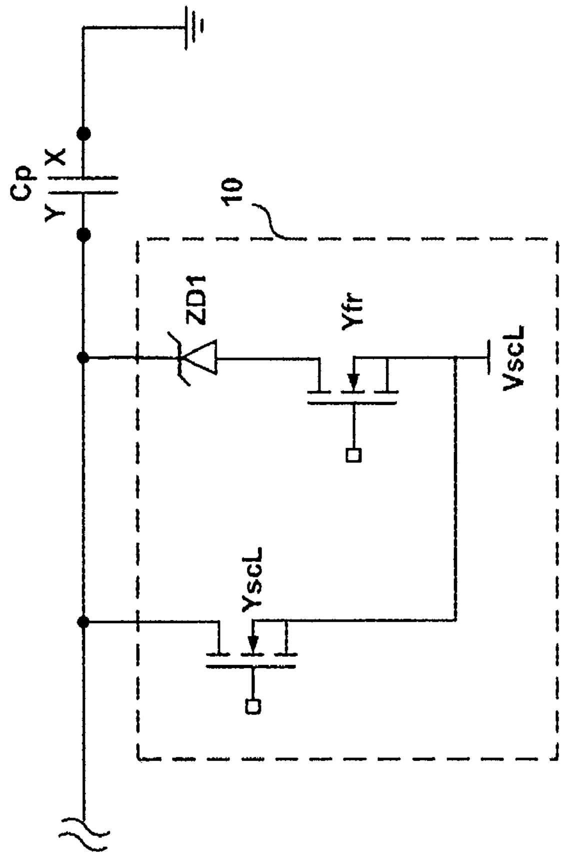
FIG.1 (Prior Art)
FIG. 1 shows a part of a conventional driving device of a plasma display device, the conventional driving device being for driving a scan electrode.

In the following detailed description, only certain exemplary embodiments of the present invention are shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to a second element, the element may be "directly coupled" to the second element or "electrically coupled" to the second element through one or more other elements. In addition, unless explicitly described to the contrary, the word "comprise" and variations such as "comprises" and "comprising" will be understood to imply the inclusion of stated elements but not the exclusion of any other elements.

Wall charges are charges formed on a wall (e.g., a dielectric layer) close to each electrode of a discharge cell. As such, although the wall charges may be described in the disclosure as being "formed" or "accumulated" on the electrodes, the wall charges, in practice, do not actually touch the electrodes. Further, a wall voltage is a potential difference formed on the wall of the discharge cell by the wall charges.

A plasma display device and a driving apparatus thereof will now be described with reference to the accompanying drawings.

Figure 2:
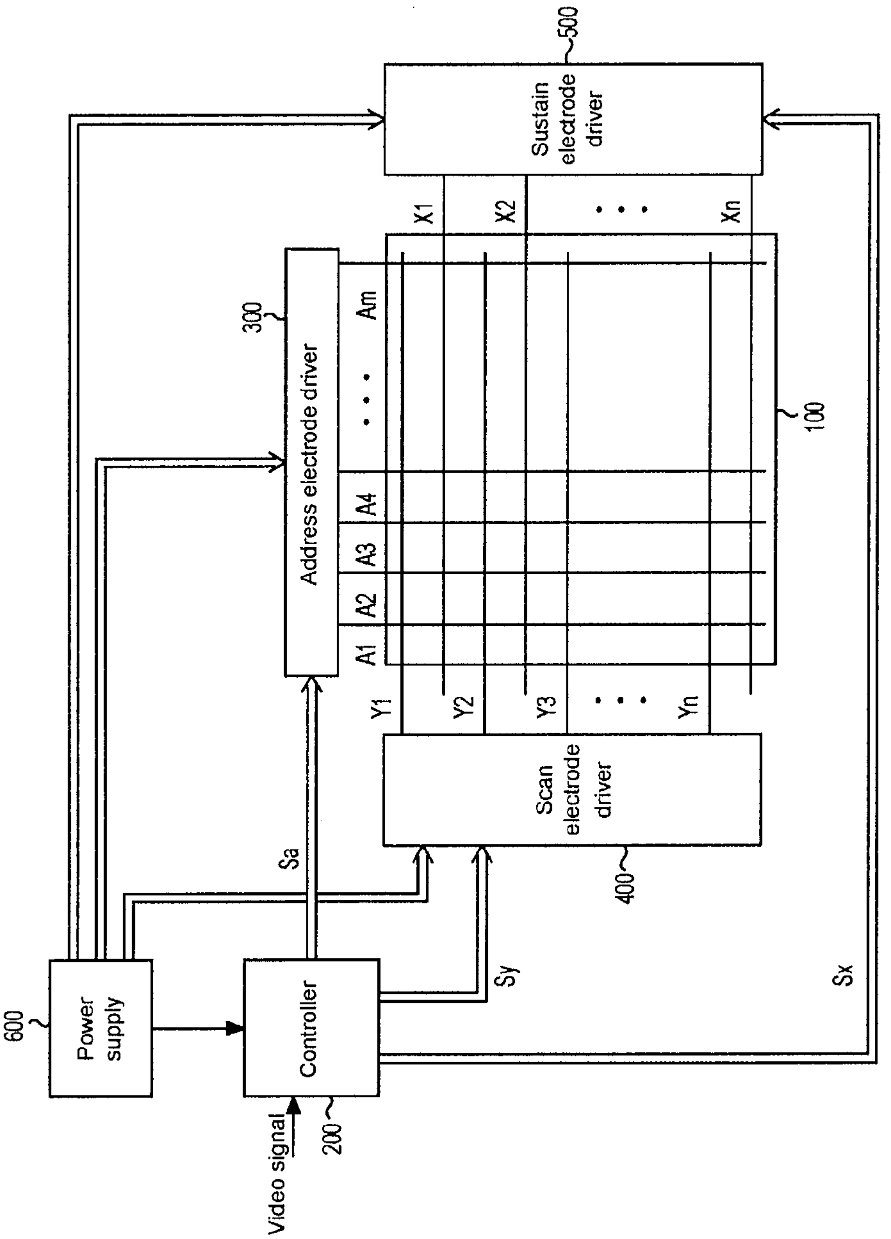
FIG. 2 is a block diagram of a plasma display device according to an exemplary embodiment of the present invention.

FIG. 2 is a block diagram of a plasma display device according to an exemplary embodiment of the present invention.

As shown in FIG. 2, the plasma display device according to the exemplary embodiment of the present invention includes a plasma display panel (PDP) 100, a controller 200, an address electrode driver 300, a scan electrode driver 400, a sustain electrode driver 500, and a power supply 600.

The PDP 100 includes a plurality of address electrodes A1 to Am extending along a column direction, and a plurality of sustain electrodes X1 to Xn and a plurality of scan electrodes Y1 to Yn extending along a row direction. The sustain electrodes X1 to Xn are formed in correspondence to the respective scan electrodes Y1 to Yn, and respective ends of the sustain electrodes are coupled to each other.

In addition, the PDP 100 includes a substrate on which the sustain and scan electrodes X1 to Xn and Y1 to Yn are arranged, and another substrate on which the address electrodes A1 to Am are arranged. The two substrates are placed facing each other with a discharge space therebetween so that the scan electrodes Y1 to Yn and the address electrodes A1 to Am may perpendicularly cross each other and the sustain electrodes X1 to Xn and the address electrodes A1 to Am may perpendicularly cross each other. Here, the discharge space formed at a crossing region of the address electrodes A1 to Am and the sustain and scan electrodes X1 to Xn and Y1 to Yn forms a discharge cell.

The above-described structure is an exemplary structure of the PDP 100, and it can be appreciated that panels of other structures can be applied to the present invention.

The controller 200 receives external video signals and outputs an address electrode driving control signal Sa, a sustain electrode driving control signal Sx, and a scan electrode driving control signal Sy. In addition, the controller 200 divides frames into a plurality of subfields for driving the plasma display device, and each subfield includes a reset period, an address period, and a sustain period with respect to time. Further, the controller 200 generates a scan high voltage Vscan_h that is applied to a cell that has not been addressed during an address period by using a direct current (DC) voltage supplied from the power supply 600, and applies the scan high voltage Vscan_h to the scan electrode driver 400 or the sustain electrode driver 500.

The address electrode driver 300 receives the address electrode driving control signal Sa from the controller 200 and applies a display data signal to each address electrode so as to select discharge cells to be displayed.

The scan electrode driver 400 receives the scan electrode driving control signal Sy from the controller 200 and applies a driving voltage to the scan electrodes Y.

The sustain electrode driver 500 receives the sustain electrode driving control signal Sx from the controller 200 and applies a driving voltage to the sustain electrodes X.

The power supply 600 supplies power for driving the plasma display device to the controller 200 and the respective drivers 300, 400, and 500.

Figure 3:
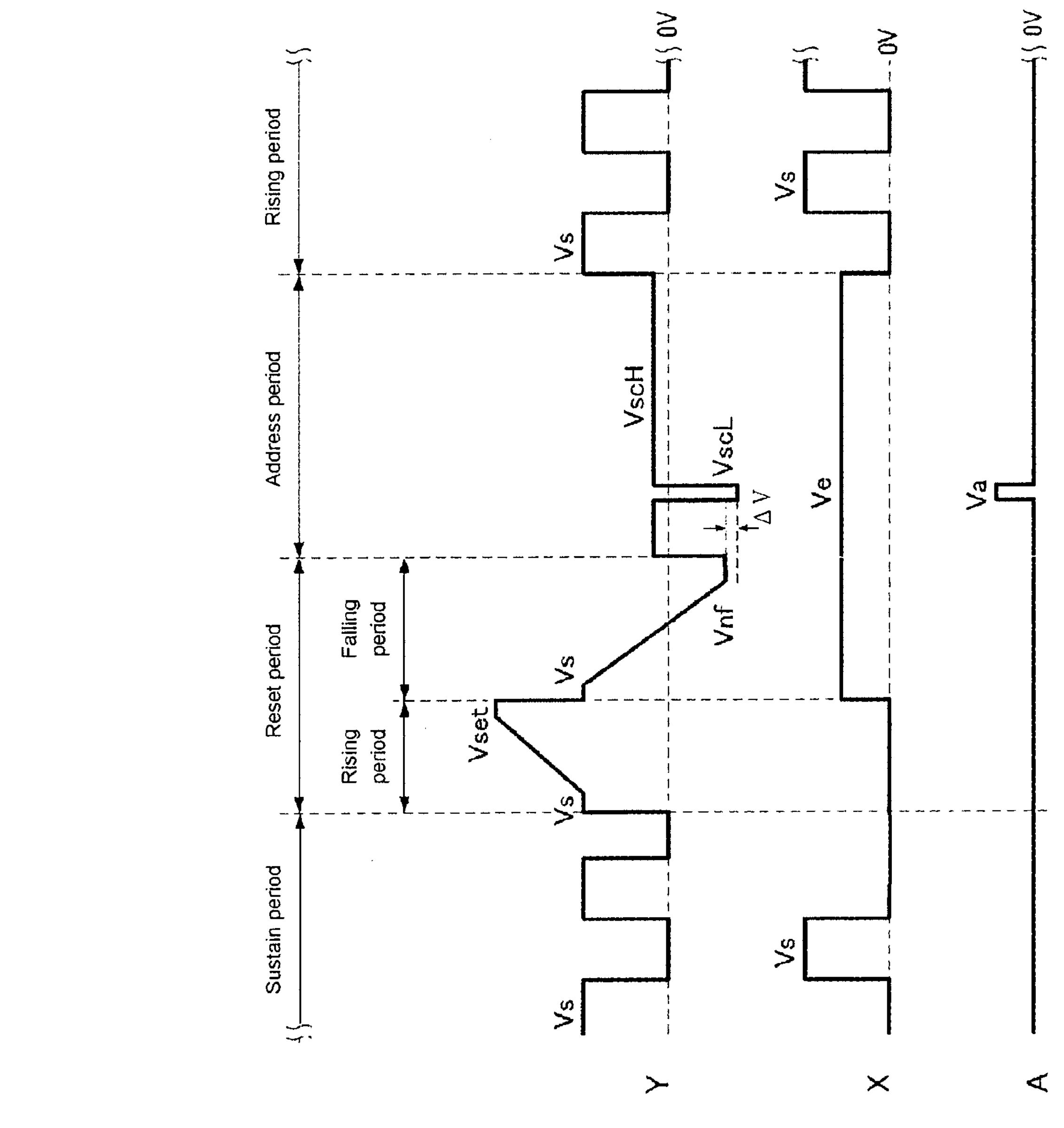
FIG. 3 is a driving waveform of the plasma display device according to an exemplary embodiment of the present invention.

FIG. 3 shows a driving waveform of the plasma display device according to the exemplary embodiment of the present invention.

FIG. 3 shows a driving waveform within one subfield, and one subfield of the PDP 100 of FIG. 2 includes a reset period, an address period, and a sustain period with variation of respective input voltages of a sustain electrode X, a scan electrode Y, and an address electrode A according to control of the controller 200 of FIG. 2.

The reset period will be described in more detail below. The reset period includes a rising period and a falling period. In the rising period, a voltage of the scan electrode Y is gradually increased from the Vs voltage to the Vset voltage while the address electrode A and the sustain electrode X are maintained at a reference voltage (e.g., 0V in FIG. 3). The increase of the voltage of the scan electrode Y triggers a weak discharge between the scan electrode Y and the sustain electrode X and between the scan electrode Y and the address electrode A, and, as a result, negative (−) wall charges are formed on the scan electrode Y and positive (+) wall charges are formed on the sustain electrode X and the address electrode A.

A sum of a wall voltage between the respective electrodes and an external input voltage corresponds to a discharge firing voltage Vf due to wall charges formed when the voltage of the scan electrode Y reaches the Vset voltage. All cells need to be initialized in the reset period, and accordingly, the Vset voltage is set to a voltage that is high enough to generate a discharge in all cells under any condition.

Although it is illustrated in FIG. 3 that the voltage of the scan electrode Y is decreased or increased in a ramp shape, another type of waveform that gradually increases or decreases may be applied.

In the falling period, the voltage of the scan electrode Y is gradually decreased from the Vs voltage to the Vnf voltage while the address electrode A and the sustain electrode X are respectively maintained at the reference voltage and the Ve voltage. The decrease of the voltage of the scan electrode Y triggers a weak discharge between the scan electrode Y and the sustain electrode X and between the scan electrode Y and the address electrode A, and, as a result, the negative (−) wall charges formed on the scan electrode Y and the positive (+) wall charges formed on the sustain electrodes and the address electrode A are erased.

As a result, the negative (−) wall charges formed on the scan electrode Y and the positive (+) wall charges formed on the sustain electrode X and the address electrode A are reduced.

Here, the positive (+) wall charges formed on the address electrode A are reduced to an amount that is sufficient for an address operation. The size of the (Vnf-Ve) voltage difference is set to be close to a discharge firing voltage Vf between the scan electrode Y and the sustain electrode X, and therefore a wall voltage difference between the scan electrode Y and the sustain electrode X becomes close to 0V such that misfiring of cells that have been addressed during the address period can be prevented during a sustain period.

Each subfield must include one falling period. In contrast, existence of a rising period for each subfield is determined by a control program (e.g., a predetermined control program) of the controller 200 of FIG. 2.

In the address period, a scan pulse having a VscL voltage is sequentially applied to a plurality of scan electrodes Y while the Ve voltage is applied to the sustain electrode X so as to select light emitting cells. Concurrently, an address voltage of Va is applied to an address electrode A adjacent to light emitting cells among a plurality of cells formed by the scan electrode Y to which the VscL voltage is applied. Accordingly, an address discharge is generated between the address electrode A applied with the address voltage and the scan electrode Y applied with the VscL voltage and between the scan electrode Y applied with the VscL voltage and a sustain electrode that corresponds to the scan electrode Y such that positive (+) wall charges are formed on the scan electrode Y and negative (−) wall charges are formed on the address electrode A and the sustain electrode X.

Here, the VscL voltage is set to be lower than the Vnf voltage. A scan electrode Y to which the VscL voltage is not applied is applied with a VscH voltage (non-scan voltage) that is higher than the VscL voltage, and an address electrode of an unselected discharge cell is applied with the reference voltage.

In the sustain period, a sustain discharge pulse (sustain pulse) alternately having a high level voltage (e.g., Vs voltage in FIG. 3) and a low level voltage (e.g., 0V in FIG. 3) is applied to the scan electrode Y and the sustain electrode X. A phase of the sustain pulse applied to the scan electrode Y is opposite to a phase of the sustain pulse applied to the sustain electrode X. Accordingly, the 0V voltage is applied to the sustain electrode X when the Vs voltage is applied to the scan electrode Y, the 0V voltage is applied to the scan electrode Y when the Vs voltage is applied to the sustain electrode X, and a discharge is generated in the scan electrode Y and the sustain electrode X by a wall voltage and the Vs voltage.

Here, the wall voltage is formed between the scan electrode Y and the sustain electrode X due to the address discharge and the Vs voltage. Processes for applying the sustain discharge pulse to the scan electrode Y and the sustain electrode X are repeated a number of times corresponding to a weight (or brightness weight) of the corresponding subfield.

A Vnf voltage supplier 410 of the scan electrode driver 400 of FIG. 2 that supplies a Vnf voltage will be described in further detail with reference to FIG. 4.

Figure 4:
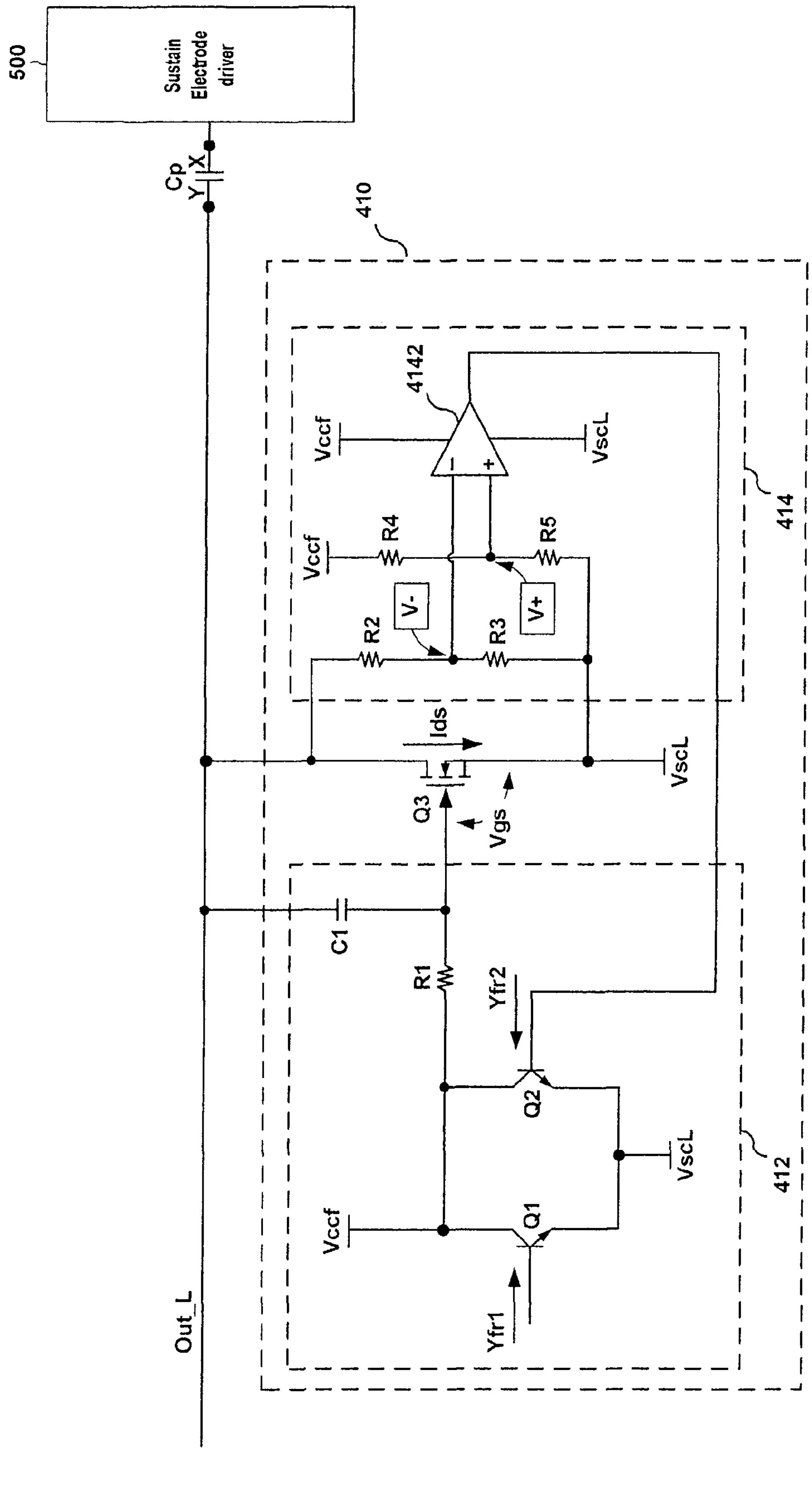
FIG. 4 shows a circuit diagram of a Vnf voltage supplier according to an exemplary embodiment of the present invention.

FIG. 4 shows a Vnf voltage supplier circuit diagram according to an exemplary embodiment of the present invention. Transistors described in the following description can be replaced with switches having the same or similar functions. In addition, a capacitive component formed by the sustain electrode X and the scan electrode Y is described herein as a panel capacitor Cp.

As shown in FIG. 4, the Vnf voltage supplier 410 includes a switching controller 412, a feedback signal generator 414, and a transistor Q3.

The switching controller 412 includes transistors Q1 and Q2, each having a collector coupled to a power source Vccf that supplies a Vccf voltage and an emitter coupled to a power source VscL that supplies a VscL voltage, a resistor R1 having a first end coupled to the collectors of the transistors Q1 and Q2 and a second end coupled to a control electrode of the transistor Q3, and a capacitor C1 having a first end coupled to an Out_L line and a second end coupled to the second end of the resistor R1. The transistor Q1 is driven by a Yfr1 signal applied to the control electrode thereof, and the transistor Q2 is driven by a Yfr2 signal applied to the control electrode thereof. Here, the Yfr2 signal is an output signal of the feedback signal generator 414. In addition, the Out_L line is coupled to a sustain driver and a reset driver that drive the scan electrode Y, and it carries the same (or substantially the same) voltage waveform as the voltage waveform applied to the scan electrode Y according to a driving waveform of the plasma display device according to an exemplary embodiment of the present invention (see, e.g., FIG. 3). In one embodiment, the Vccf voltage is higher than the VscL voltage by about 15V, and, similar to the VscL voltage, is generated and supplied from the power supply 600 of FIG. 2.

The feedback signal generator 414 includes resistors R2, R3, R4, and R5, and a comparator 4142. The resistor R2 has a first end coupled to a drain of the transistor Q3 and a second end coupled to an inverting input end of the comparator 4142, the resistor R3 has a first end coupled to the second end of the resistor R2 and a second end coupled to a source of the transistor Q3, the resistor R4 has a first end coupled to the power source Vccf that supplies the Vccf voltage and a second end coupled to a non-inverting input end of the comparator 4142, and the resistor R5 has a first end coupled to the second end of the resistor R4 and a second end coupled to the second end of the resistor R3. The comparator 4142 compares a voltage input through the non-inverting input end and a voltage input through the inverting input end and selectively outputs either the Vccf voltage or the VscL voltage according to the comparison result.

The transistor Q3 has a drain coupled to the Out_L line and a source coupled to the power source VscL that supplies the VscL voltage, and is driven by an output signal from the switching controller 412 that is input to the control electrode of the transistor Q3.

In the Vnf voltage supplier 410 of FIG. 4, the resistor R1 included in the switching controller 412 turns on the transistor Q3 when current flows through a current path formed from the power source Vccf through the resistor R1 to the control electrode of the transistor Q3. Here, the resistor R1 has a relatively high resistance value such that a relatively low voltage is applied to the gate of the transistor Q3. Accordingly, a Vgs voltage between the gate and source of the transistor Q3 increases slightly (e.g., by a predetermined level).

In addition, resistance values of the resistors R2, R3, R4, and R5 included in the feedback signal generator 414 are set (or selected) such that a voltage at a node between the drain of the transistor Q3 and the resistor R2 is controlled. That is, with reference to the driving waveform of FIG. 3, the resistances of the resistors R2, R3, R4 and R5 are selected such that, during the falling period of the reset period, a voltage V− applied to the inverting input end of the comparator 4142 becomes equal to a voltage V+ applied to the non-inverting input end of the comparator 4142 at the time when the voltage applied to the scan electrode Y decreases from the voltage Vs to the voltage Vnf.

In one embodiment, all or some of the resistors R2, R3, R4, and R5 included in the feedback signal generator 414 may be replaced with variable resistors having resistance values that change according to a control signal applied from the controller 200 of FIG. 2 so as to change the Vnf voltage. Accordingly, a voltage difference ΔV between the VscL voltage and the Vnf voltage can be modified so that design compatibility of the plasma display device and discharge space variation due to a discharge margin can be managed.

With reference to the driving waveform of the plasma display device of FIG. 3, driving of the Vnf voltage supplier 410 of FIG. 4 will be described in further detail with additional reference to the truth table of FIG. 5.

In the truth table, “0” or “1” respectively represents a level (e.g., a predetermined level) of a voltage signal to turn off or on the transistors Q1 and Q2. In addition, the Yfr1 signal is maintained at “1” in a falling period of a reset period, except for a period during which a voltage applied to the scan electrode Y starts to decrease from the Vs voltage to the Vnf voltage to the end of the reset period, so as to maintain the transistor Q1 in a turn-on state.

FIG. 5 shows the truth table that represents the states of two input signals Yfr1 and Yfr2 of the Vnf voltage supplier 410 and the corresponding states of the transistors Q1, Q2, and Q3.

Driving of the Vnf voltage supplier 410 in the reset period will now be described in more detail.

From a rising period of the reset period to the falling period of the reset period, the Yfr1 signal is maintained at the level “1” until a voltage applied to the scan electrode Y starts to decrease to the Vnf voltage from the Vs voltage, and accordingly, the transistor Q1 is maintained in the turn-on state and the transistor Q3 is maintained in a turn-off state. Here, the voltage applied to the scan electrode Y is higher than a Vccf voltage that is higher than the VscL voltage by about 15 V, and a voltage at the Out_L line equals the voltage of the scan electrode Y, and therefore a voltage V− input to the inverting input end of the comparator 4142 is maintained to be higher than a voltage V+ input to the non-inverting input end of the comparator 4142. As a result, the Yfr2 signal has the level “0”, and the transistor Q2 is maintained in the turn-off state.

When the Yfr1 signal is changed from the level “1” to the level “0” at a time that the voltage applied to the scan electrode Y starts to decrease to the Vnf voltage from the Vs voltage in the falling period of the reset period, the transistor Q1 is turned off and the transistor Q3 is turned on. Here, the transistor Q3 is turned on since the resistor R1 has a relatively high resistance value such that a voltage applied to a gate of the transistor Q3 is relatively low. Accordingly, a Vgs voltage between the gate and source of the transistor Q3 is a relatively low voltage, increasing slightly (e.g., by a predetermined level). When a weak current Ids flows to the source from the drain of the transistor Q3, a voltage at a node between the drain of the transistor Q3 and the resistor R2 is decreased, causing the voltage applied to the scan electrode Y to be decreased. Here, the voltage V− output from a voltage divider formed by the resistors R2 and the R3 according to the voltage applied to the scan electrode Y is still higher than a voltage output from a voltage divider formed by the resistors R4 and R5 according to the Vccf voltage, and, accordingly, the Yfr2 signal can be maintained at the level “0”.

When the Yfr1 signal is changed from the level “0” to the level “1”, the transistor Q3 is turned off. Here, the voltage V− output from the voltage divider formed by the resistor R2 and the resistor R3 according to the voltage applied to the scan electrode Y is still higher than the voltage V+ output from the voltage divider formed by the resistor R4 and the resistor R5 according to the Vccf voltage, and therefore the Yfr2 signal can be continued to be maintained at the level “0”.

The controller 200 (of FIG. 2) according to an exemplary embodiment of the present invention alternately applies (i.e., changes from the level “0” to the level “1” and vice versa) the Yfr1 signal to the Vnf voltage supplier 410 from a time that the voltage applied to the scan electrode Y is decreased from the Vs voltage to the Vnf voltage in the falling period of the reset period, and the voltage applied to the scan electrode Y is gradually decreased in the form of a ramp waveform as the above-described process is repeated.

When the voltage applied to the scan electrode Y reaches the Vnf voltage (e.g., the predetermined Vnf voltage) in the falling period of the reset period, the voltage V− becomes equal to the voltage V+, and therefore an output signal (i.e., Yfr2) of the comparator 4142 becomes the level “1”. Here, the transistor Q3 is turned off regardless of the level of the Yfr1 signal, and the voltage applied to the scan electrode Y is maintained at the Vnf voltage until the reset period is terminated.

When an address period starts after the reset period, a scan driver that applies a scan voltage to the scan electrode Y is driven and applies a VscH voltage to the scan electrode Y, and therefore the voltage V− becomes higher than the voltage V+ and the Yfr2 signal is changed to the level “0”. When the reset period is terminated, the Yfr1 signal is maintained at the level “1” until the voltage applied to the scan electrode Y starts to decrease to the Vnf voltage from the Vs voltage in a falling period of a reset period of the next subfield, and therefore the transistor Q1 is maintained in the turn-on state, and the transistor Q3 is maintained in the turn-off state.

The output signal of the switching controller 412, that is, the signal applied to the control electrode of the transistor Q3, turns on the transistor Q3 only when both the Yfr1 signal and the Yfr2 signal that control the driving operation of the transistors Q1 and Q2 become the level “0”. When either the Yfr1 signal or the Yfr2 signal becomes the level “1”, the transistor Q3 is turned off. That is, when either the Yfr1 signal or the Yfr2 signal is changed to the level “1”, one of the transistors Q1 and Q2 is turned on and a current path is formed from the power source Vccf to the power source VscL, and, accordingly, a voltage is not applied to the control electrode of the transistor Q3. Such a driving operation of the switching controller 412 is similar to applying an output signal of a NOR logic gate to the transistor Q3, as shown in FIG. 6.

Figure 6:
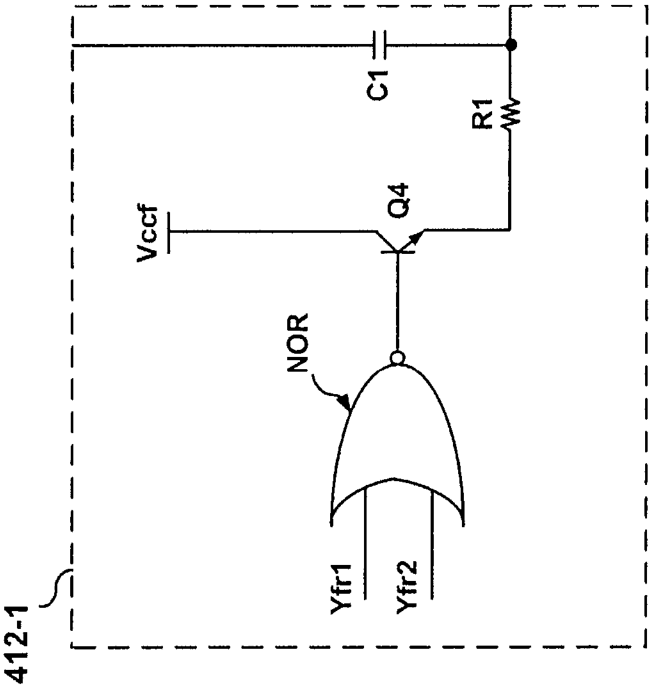
FIG. 6 shows a circuit diagram of a switching controller implemented in NOR logic according to an exemplary embodiment of the present invention.

FIG. 6 shows a switching controller 412-1 implemented with NOR logic according to an exemplary embodiment of the present invention. In FIG. 6, circuit elements that perform the same (or like) functions as the switching controller 412 of FIG. 4 will be notated with the same (or like) reference numerals.

As shown in FIG. 6, a switching controller 412-1 includes a NOR logic gate, a transistor Q4, a resistor R1, and a capacitor C1. The NOR logic gate receives the Yfr1 signal and the Yfr2 signal and performs a NOR logic operation, the transistor Q4 has a collector coupled to the power source Vccf that supplies the Vccf voltage and a control electrode coupled to the output terminal of the NOR logic gate, the resistor R1 has a first end coupled to an emitter of the transistor Q4 and a second end coupled to the control electrode of the transistor Q3 of FIG. 4, and the capacitor C1 has a first end coupled to the second end of the resistor R1 and a second end coupled to the scan electrode Y.

The transistor Q4 is turned on/off according to an output signal of the NOR logic gate, and a driving process of the transistor Q4 is the same as (or similar to) a driving process of the transistor Q3. The driving process of the transistor Q3 corresponding to the Yfr1 and Yfr2 signals is shown in the truth table of FIG. 5.

Unlike the embodiment as shown in FIG. 6, in other exemplary embodiments of the present invention, the switching controller 412 can be implemented using NAND logic, OR logic, or AND logic. An example of implementing the switching controller 412 according to another exemplary embodiment of the present invention by using AND logic is shown in FIG. 7.

Figure 7:
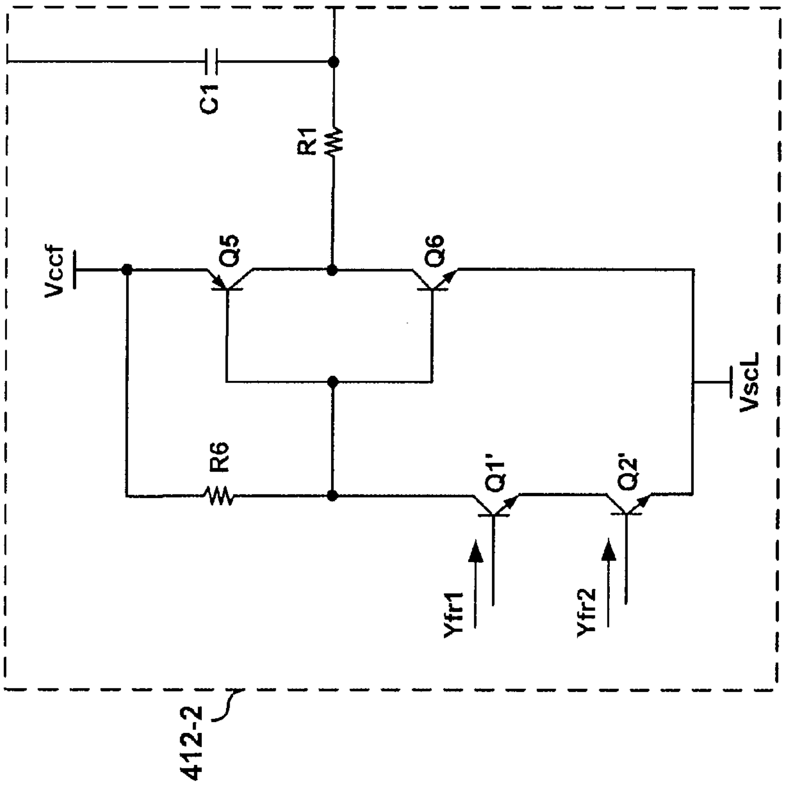
FIG. 7 shows a circuit diagram of a switching controller according to another exemplary embodiment of the present invention.

FIG. 7 shows a switching controller 412-2 according to another exemplary embodiment of the present invention. In FIG. 7, same (or like) reference numbers with respect to FIG. 4 designate same (or like) elements of the switching controller of FIG. 4.

As shown in FIG. 7, a switching controller 412-2 includes a resistor R6, transistors Q1', Q2', Q5, and Q6, a resistor R1, and a capacitor C1. The resistor R6 has a first end coupled to a power source Vccf that supplies a Vccf voltage. The transistor Q1' is coupled to a second end of the resistor R6. The transistor Q2' has a collector coupled to an emitter of the transistor Q1' and an emitter coupled to a power source VscL that supplies a VscL voltage. The transistor Q5 has an emitter coupled to the power source Vccf that supplies the Vccf voltage. The transistor Q6 has a collector coupled to the collector of the transistor Q5 and an emitter coupled to the power source VscL that supplies the VscL voltage. The resistor R1 has a first end coupled to the collector of the transistor Q5 and a second end coupled to the transistor Q3 of FIG. 4. The capacitor C1 has a first end coupled to the second end of the resistor R1 and a second end coupled to the scan electrode Y.

Here, the transistor Q1' is turned on/off by the Yfr1 signal input from the controller 200 of FIG. 2 through the control electrode, and the transistor Q2' is turned on/off by the Yfr2 signal output from the feedback signal generator 414 of FIG. 4. In addition, the transistors Q5 and Q6 are coupled to one end of the resistor R6 and are turned on/off by a driving operation of the transistors Q1' and Q2'.

A driving operation of a Vnf voltage supplier 410-2 including the switching controller 412-2 of FIG. 7 will be described in further detail by using a truth table of FIG. 8.

The truth table of FIG. 8 shows two input signals Yfr1 and Yfr2 of the Vnf voltage supplier 410-2 and driving of the corresponding transistors Q1', Q2', Q3, Q5, and Q6.

As shown in the truth table of FIG. 8, the transistor Q5 included in the Vnf voltage supplier 410-2 including the switching controller 412-2 of FIG. 7 is turned on when both the Yfr1 signal and the Yfr2 signal have the level "1", and is turned off in other cases. Further, the transistor Q6 is turned on/off opposite to the transistor Q5. That is, the transistors Q1' and the transistor Q2' are in the turn-on state only when both the Yfr1 signal and the Yfr2 signal have the level "1", and therefore a voltage at a node between the resistor R6 and the transistor Q1' becomes the VscL voltage, and accordingly, the NPN-type transistor Q6 is turned off and the PNP-type transistor Q5 is turned on.

In contrast, when neither the Yfr1 signal north Yfr2 signal has the level "1", at least one of the transistor Q1' and the transistor Q2' is in the turn-off state, and therefore a voltage at a node between the resistor R6 and the transistor Q1' becomes equal to a (Vccf-R6) voltage so that the NPN-type transistor Q6 is turned on and the PNP-type transistor Q5 is turned off. Here, when the transistor Q6 is turned on, a current flows through a current path formed from the power source Vccf through the resistor R6 and the transistor Q6 to the power source VscL so that the transistor Q3 of FIG. 4 is turned off.

In contrast, when the transistor Q5 is turned on, the current flows through a current path formed from the power source Vccf through the transistor Q5 to a control electrode of the transistor Q3 of FIG. 4 so that the transistor Q3 of FIG. 4 is turned on. As described above, a turn-on/turn-off timing of the transistor Q3 of FIG. 4 corresponds to a turn-on/turn-off timing of the transistor Q5, and the transistor Q3 of FIG. 4 is turned on only when both the Yfr1 signal and the Yfr2 signal have the level "1".

Figure 9:
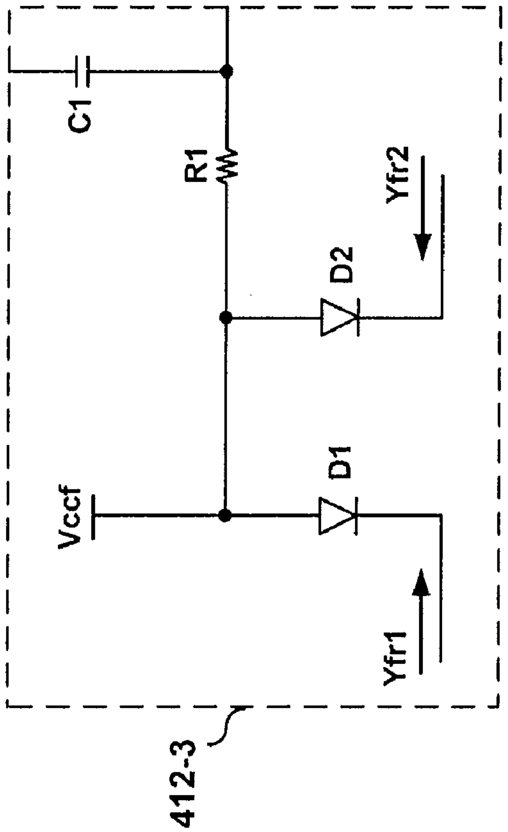
FIG. 9 shows a circuit diagram of a switching controller according to another exemplary embodiment of the present invention.

Unlike as illustrated in FIG. 4, FIG. 6, and FIG. 7, the switching controller according to another exemplary embodiment of the present invention can be implemented by a circuit by using diodes as shown in FIG. 9.

FIG. 9 shows a switching controller 412-3 according to another exemplary embodiment of the present invention. In FIG. 9, same (or like) reference numerals designate same (or like) elements of the switching controller 412 of FIG. 4.

As shown in FIG. 9, a switching controller 412-3 includes diodes D1 and D2, a resistor R1, and a capacitor C1. The diode D1 has an anode coupled to a power source Vccf supplying a Vccf voltage and a cathode coupled to an input end through which a Yfr1 signal is input from the controller 200 of FIG. 2, and the diode D2 has an anode coupled to the power source Vccf and a cathode coupled to the output end of the feedback signal generator 414 of FIG. 4. The resistor R1 has a first end coupled to the power source Vccf and a second end coupled to the transistor Q3 of FIG. 4, and the capacitor C1 has a first end coupled to the second end of the resistor R1 and a second end coupled to the scan electrode Y.

Here, when either a Yfr1 signal level or a Yfr2 signal level is "0", that is, when either the Yfr1 signal or the Yfr2 signal is a VscL voltage signal that is lower than the Vccf voltage, a current flows from the power source Vccf through the diodes D1 and D2 so that the transistor Q3 of FIG. 4 is turned off. When both the Yfr1 signal level and the Yfr2 signal level are "1" (i.e., the Vccf voltage signal), a current does not flow from the anode to the cathode of each of the diodes D1 and D2, and the Vccf voltage supplied from the power source Vccf flows to the control electrode of the transistor Q3 of FIG. 4 so that the transistor Q3 of FIG. 4 is turned on. That is, the driving operation of the switching controller 412-3 according to the present exemplary embodiment of the present invention corresponds to the turn-on/turn-off operation of the transistor Q3 corresponding to the Yfr1 signal and the Yfr2 signal of the truth table of FIG. 8, without including the transistors Q1', Q2', Q5, and Q6.

The Vnf voltage supplier 410 according to exemplary embodiments of the present invention can significantly reduce implementation cost and driving power consumption of the plasma display device driver compared to the conventional plasma display device using the Zener diode having a high withstand voltage. In addition, since the Vnf voltage can be changed in one embodiment by using the resistors R2, R3, R4, and R5, each having a variable resistance value, the size of ΔV can be modified, and therefore the design compatibility of the plasma display device and width variation due to a discharge margin can be managed accordingly.

Further, the transistor Q3 of FIG. 4 is driven by using the switching controllers 412, 412-1, 412-2, and 412-3, which are controlled by the two signals Yfr1 and Yfr2, and therefore a possibility of operation errors due to noise can be reduced, compared to a conventional method of controlling the switch by using one signal for supplying the Vnf voltage. Furthermore, even if an error occurs in the Yfr1 signal input to the switching controllers 412, 412-1, 412-2, and 412-3 due to an operation error of the controller 200 of FIG. 2 after the voltage of the scan electrode Y is decreased to the Vnf voltage, the voltage of the scan electrode Y can be prevented from being decreased to be lower than a voltage (e.g., a predetermined voltage) by using resistance values of the resistors R2, R3, R4, and R5.

In other embodiments, the Vnf voltage supply 410 included in the scan electrode driver 400 of FIG. 2 may be included in the sustain electrode driver 500 of FIG. 2, and it supplies the Vnf voltage to the sustain electrodes X so as to drive the sustain electrodes X.

In other embodiments, the Vnf voltage supply 410 according to exemplary embodiments of the present invention can be used as a driving apparatus of a plasma display device as well as a display device that includes a liquid crystal display panel.

As described above, according to exemplary embodiments of the present invention, plasma display device implementation cost and driving power consumption can be significantly reduced, compared to the conventional plasma display device that uses the Zener diode having a high withstand voltage.

In addition, according to exemplary embodiments, the size of ΔV can be modified by changing the Vnf voltage so that design compatibility of the plasma display device and variation width due to a discharge margin can be managed.

In addition, according to exemplary embodiments, a voltage of the scan electrode Y can be prevented from being decreased to be lower than a voltage level (e.g., a predetermined voltage level) due to noise and malfunction of a controller.

While the present invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A plasma display device comprising:

a plasma display panel having a plurality of first electrodes, a plurality of second electrodes, and a plurality of third electrodes crossing the first and second electrodes;

a power supply comprising a first power source for supplying a first voltage and a second power source for supplying a second voltage higher than the first voltage;

a driving circuit for driving the first electrodes; and a controller for generating a first signal to control a driving operation of the driving circuit, wherein the driving circuit comprises:

a first switch for supplying a third voltage to the first electrodes, the third voltage decreasing over a period of time;

a switching controller for controlling the first switch in accordance with the first signal and a second signal; and a feedback signal generator for comparing a fourth voltage proportional to the third voltage with a fifth voltage corresponding to the second voltage, adjusting a level of the second signal according to a result of comparing the fourth voltage with the fifth voltage, and supplying the second signal to the switching controller.

2. The plasma display device of claim 1, wherein a first end of the first switch is coupled to the first electrodes and a second end of the first switch is coupled to the first power source.

3. The plasma display device of claim 2, wherein the switching controller comprises:

a first diode having an anode coupled to the second power source and a cathode coupled to receive the first signal;

a second diode having an anode coupled to the second power source and a cathode coupled to receive the second signal from the feedback signal generator; and a first resistor having a first end coupled to the anodes of the first and second diodes and a second end coupled to a control electrode of the first switch.

4. The plasma display device of claim 2, wherein the switching controller comprises:

a NOR logic gate for outputting a third signal in accordance with the first and second signals;

a second switch having a first end coupled to the second power source, and configured to be turned on and off in accordance with the third signal; and a first resistor having a first end coupled to a second end of the second switch and a second end coupled to a control electrode of the first switch.

5. The plasma display device of claim 4, wherein the first switch is configured to be turned on and off concurrently with the second switch.

6. The plasma display device of claim 2, wherein the switching controller comprises:

a second switch having a first end coupled to the second power source;

a third switch having a first end coupled to the first power source and a second end coupled to a second end of the second switch;

a first resistor having a first end coupled between the second switch and the third switch and a second end coupled to a control electrode of the first switch;

a second resistor having a first end coupled to the second power source and a second end coupled to control electrodes of the second and third switches;

a fourth switch having a first end coupled to the control electrode of the third switch, and configured to be turned on and off in accordance with the first signal; and a fifth switch having a first end coupled to a second end of the fourth switch and a second end coupled to the first power source, and being configured to be turned on and off in accordance with the second signal.

7. The plasma display device of claim 6, wherein the second switch is turned on when both the fourth switch and the fifth switch are turned on.

8. The plasma display device of claim 7, wherein the first switch is turned on and off concurrently with the second switch.

9. The plasma display device of claim 2, wherein the switching controller comprises:

a second switch and a third switch coupled in parallel between the second power source and the first power source; and a first resistor having a first end coupled to a first end of the second switch, a first end of the third switch and the second power source, and a second end coupled to a control electrode of the first switch.

10. The plasma display device of claim 9, wherein the first switch is turned on when both the second switch and the third switch are turned off.

11. The plasma display device of claim 9, wherein the switching controller is adapted to maximize a level of current flowing from the first end of the first switch to the second end of the first switch when the third voltage reaches a sixth voltage and the fourth voltage becomes substantially equal to the fifth voltage.

12. The plasma display device of claim 11, wherein the switching controller is further adapted to turn off the first switch when the switching controller detects that the third voltage reaches the sixth voltage.

13. The plasma display device of claim 12, wherein the first voltage is a scan voltage that is sequentially applied to the plurality of first electrodes during an address period.

14. The plasma display device of claim 13, wherein the sixth voltage is higher than the first voltage.

15. The plasma display device of claim 11, wherein the first switch is configured to be repeatedly turned on and off during a portion of a reset period to gradually decrease a voltage of the first electrodes from a seventh voltage to the sixth voltage.

16. A driving apparatus of a display device having a power supply for generating a first voltage, a controller for generating a first signal, and a plurality of first electrodes, the driving apparatus comprising:

a first switch for supplying a second voltage to the first electrodes, the second voltage being configured to decrease over a period of time;

a switching controller for controlling the first switch in accordance with the first signal and a second signal; and a feedback signal generator for comparing a third voltage and a fourth voltage proportional to the second voltage, adjusting a level of the second signal, and supplying the second signal to the switching controller.

17. The driving apparatus of claim 16, wherein the first switch has a first end coupled to the first electrodes and a second end coupled to a first power source for supplying a fifth voltage lower than the first voltage.

18. The driving apparatus of claim 17, wherein the feedback signal generator comprises:

a first voltage divider for generating the third voltage by dividing the first voltage;

a second voltage divider for generating the fourth voltage by dividing the second voltage; and a comparator for comparing the third voltage with the fourth voltage and producing the second signal according to a result of comparing the third voltage with the fourth voltage, the level of the second signal corresponding to the first voltage or the fifth voltage.

19. The driving apparatus of claim 18, wherein the second voltage divider comprises a first resistor and a second resistor, wherein the first voltage divider comprises a third resistor and a fourth resistor, wherein the first resistor has a first end coupled to the first end of the first switch and a second end coupled to a first input end of the comparator, wherein the second resistor has a first end coupled to the second end of the first switch and a second end coupled to the first power source, wherein the third resistor has a first end coupled to a second power source coupled to the power supply and for supplying the first voltage and a second end coupled to a second input end of the comparator, and wherein a fourth resistor has a first end coupled to the second end of the third resistor and a second end coupled to the first power source.

20. The driving apparatus of claim 19, wherein the driving apparatus is adapted to generate a third signal to change a sixth voltage by modifying resistance values of the first, second, third and fourth resistors, wherein the sixth voltage is a level of the second voltage when the third voltage becomes substantially equal to the fourth voltage.

21. The driving apparatus of claim 20, wherein the first switch is configured to be repeatedly turned on and off to gradually decrease a voltage of the first electrodes from a seventh voltage to the sixth voltage.

22. The driving apparatus of claim 20, wherein the sixth voltage is higher than the fifth voltage.

* * * * *